(12) United States Patent
Ulrich (10) Patent No.: US 10,779,506 B1
(45) Date of Patent: Sep. 22, 2020

(54) FULLY AUTOMATED, SENSOR-DRIVEN, CATCH SYSTEM FOR A HYDRAULIC LIVESTOCK SQUEEZE CHUTE

(71) Applicant: Matthew J. Ulrich, Dodge, NE (US)

(72) Inventor: Matthew J. Ulrich, Dodge, NE (US)

( * ) Notice: Subject to any disclaimer, the term of this patent is extended or adjusted under 35 U.S.C. 154(b) by 148 days.

(21) Appl. No.: 16/169,124

(22) Filed: Oct. 24, 2018

(51) Int. Cl.
*A01K 1/06* (2006.01)
*A01K 15/04* (2006.01)

(52) U.S. Cl.
CPC .......... *A01K 1/0613* (2013.01); *A01K 15/04* (2013.01)

(58) Field of Classification Search
USPC .............. 119/729–734, 738, 740–742, 843
See application file for complete search history.

(56) References Cited

U.S. PATENT DOCUMENTS

| | | |
|---|---|---|
| 3,221,707 A | 12/1965 | Pearson |
| 4,100,886 A | 7/1978 | Wade et al. |
| 4,136,640 A | 1/1979 | Gofflot |
| 4,167,155 A | 9/1979 | Wade et al. |
| 4,226,212 A | 10/1980 | Priefert |
| 4,632,063 A | 12/1986 | Priefert |
| 4,702,200 A | 10/1987 | Simington |
| 4,967,083 A | 10/1990 | Kornbrekke et al. |
| 5,109,802 A | 5/1992 | Priefert |
| 5,979,365 A | 11/1999 | Sorraghan et al. |
| 6,234,061 B1 * | 5/2001 | Glasson ................ F15B 15/283 33/763 |
| 6,609,480 B2 | 8/2003 | Daniels et al. |
| 7,770,542 B2 | 8/2010 | Mollhagen |
| 7,918,191 B2 | 4/2011 | Gipson |
| 8,146,417 B2 * | 4/2012 | Glasson ................... F15B 1/08 73/168 |
| 8,910,595 B2 * | 12/2014 | Ulrich ................. A01K 1/0613 119/732 |
| 2002/0124655 A1 * | 9/2002 | Babala ................. G01L 19/147 73/715 |
| 2004/0007191 A1 | 1/2004 | Greeson |
| 2005/0132978 A1 | 6/2005 | Bentz |
| 2006/0254532 A1 | 11/2006 | Boriack et al. |
| 2009/0318801 A1 | 12/2009 | Haynes |
| 2013/0047930 A1 | 2/2013 | Risser |
| 2015/0230428 A1 * | 8/2015 | Fussell, Jr. ............. B05B 12/08 119/667 |

* cited by examiner

*Primary Examiner* — Andrea M Valenti
(74) *Attorney, Agent, or Firm* — Dennis L. Thomte; Thomte Patent Law Office LLC (57) ABSTRACT

A fully automated, sensor driven catch system for a livestock squeeze chute includes an elongated sensor support member mounted on the upper end of the squeeze chute which has first, second, third and fourth sensors mounted thereof. A fifth sensor is built into one of the head gate hydraulic cylinders. A sixth sensor is built into the hydraulic cylinder for controlling the side squeeze panels of the chute. A seventh sensor is built into one of the hydraulic cylinders for controlling the tail gate hydraulic cylinders. The sensors are connected to a control module which is connected to a hydraulic valve module. The sensors send signals to the control module which controls the hydraulic cylinder of the tail gate assembly, the side squeeze panels and the head gate assembly. The sensors sense the movement of the animal as it passes through the chute which in turn controls the hydraulic cylinders.

4 Claims, 7 Drawing Sheets

FULLY AUTOMATED, SENSOR-DRIVEN, CATCH SYSTEM FOR A HYDRAULIC LIVESTOCK SQUEEZE CHUTE

BACKGROUND OF THE INVENTION

Field of the Invention

This invention relates to a hydraulic livestock squeeze chute and more particularly to a fully automated, sensor-driven catch and release system for a hydraulic livestock squeeze chute.

Description of the Related Art

In the practice of livestock husbandry, it is necessary to restrain livestock such as cattle and bison by way of a squeeze chute having a tail gate, a head gate, and opposite side squeeze panels. The squeeze chute is commonly used for treating or performing typical procedures on livestock such as weighing, vaccinations, identification references, doctoring, and sorting. The head gate portion of the hydraulic squeeze chute is used to catch the animal's head and to restrain the animal. The side squeeze chute apparatus of the squeeze chute restrains the animal's body to keep the animal still and safe with the tail gate of the squeeze chute keeping secondary animals from coming into the chute while it is occupied. The conventional aspects of a squeeze chute are to keep the animals still and safe to administer the typical procedures.

All hydraulic squeeze chutes, of which Applicant is aware, in the industry today require that the operator manually operate the levers of a valve body on the hydraulic squeeze chute to catch the animal and restrain it to hold it still while treating or processing the animal. With a person performing the function, there can be missed catches due to lack of concentration or distraction. This can lead to catching the animal in the wrong place, potentially hurting the animal, as well as causing excess wasted time.

Applicant's previous U.S. Pat. No. 8,910,595 B2 issued on Dec. 16, 2014 and represents a significant advance in the art. The instant invention represents a further improvement in the art.

SUMMARY OF THE INVENTION

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

A fully automated, sensor-driven, catch and release system is provided for a hydraulic livestock squeeze chute, wherein the squeeze chute has a tail end and a head end. The instant invention may be used on other types of hydraulic squeeze chutes as well. The squeeze chute illustrated in the drawings comprises a lower frame having a tail end, a head end, a first side and a second side. The illustrated squeeze chute also includes an upper frame which is positioned above the lower frame and which has a tail end, a head end, a first side and a second side. A tail gate assembly is provided on the squeeze chute at the tail ends of the lower and upper frames for selectively closing the tail end of the chute. The tail gate assembly includes first and second tail gate members which are movable between open and closed positions. The squeeze chute also includes a head gate assembly which is provided at the head ends of the lower and upper frames for selectively closing the head end of the chute with the head gate assembly including a head catch portion thereon.

A pair of hydraulic cylinders are secured to the tail gate assembly for opening and closing the tail gate members of the tail gate assembly. A pair of hydraulic cylinders are secured to the head gate assembly for pivotally moving the head gate members between open and closed positions. Normally, the squeeze chute will include a pair of side squeeze panels which are movably mounted on the frame means of the chute and which is controlled by a hydraulic cylinder.

An elongated sensor support member or rail is mounted on the upper end of the squeeze chute and which has a head end and a tail end. First, second, third and fourth sensors are mounted on the sensor support member in a longitudinally spaced-apart manner. One of the head gate hydraulic cylinders has a built-in fifth sensor. The side squeeze panels hydraulic cylinder has a built-in sixth sensor. One of the tail gate hydraulic cylinders has a built-in seventh sensor.

A control module with a software program is mounted on the squeeze chute. The control module includes a control button. Leads from the first, second, third, fourth, fifth, sixth and seventh sensors extend to the input side of the control module. The invention also includes a valve module or valve body having a hydraulic fluid supply and return valve portion, a hydraulic bottom valve or spool portion, a head gate valve or spool portion, a side squeeze panel valve or spool portion and a tail gate valve or spool portion.

The head gate portion, the side squeeze panel valve portion and the tail gate valve portion have open solenoids and close solenoids connected thereto. A pressure sensor (sensor number 8) is connected to the supply and return valve portion. A lead extends from sensor 8 to the control module. The hydraulic bottom valve portion is not operative in the present invention but may be used in the future. Leads extend from the close solenoids of head gate valve portion, the side squeeze panel valve portion and the tail gate valve portion to the control module. Leads extend from the open solenoids of the head gate valve portion, the side squeeze panel valve portion and the tail gate valve portion to the control module. Manual levers are connected to the open solenoids of the head gate valve portion, the side squeeze panel valve portion and the tail gate valve portion. Hydraulic hoses are connected to the supply and return sides of the supply and return valve portion with those hoses being connected to an electric pump and tank. Hydraulic hoses connect the head gate valve portion to the head gate cylinders. Hydraulic hoses connect the side squeeze panel valve portion to the side squeeze panel hydraulic cylinder. Hydraulic hoses connect the tail gate valve portion to the tail gate hydraulic cylinder.

The present invention leads to more efficient processing of the animal by having the computer causing the animal to be caught instead of a person manually operating the catch system. The present invention catches the animals with more accuracy and increased efficiency than a person.

It is therefore a principal object of the invention to provide a fully-automated, sensor-driven, catch system for a hydraulic livestock squeeze chute.

A further object of the invention is to provide a system of the type described which leads to more efficient processing of an animal by having a computer causing the animal to be caught.

A further object of the invention is to provide a system of the type described which will catch the animals with more accuracy and increased efficiency than if a catch system is being operated by a person.

A further object of the invention is to provide a system of the type described which eliminates miss catches due to lack of concentration or distraction by the person normally operating the system.

A further object of the invention is to provide a system of the type described which may be utilized with a hydraulic squeeze chute of almost any design.

These and other objects will be apparent to those skilled in the art.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DESCRIPTION OF THE PREFERRED EMBODIMENT

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense in that the scope of the present invention is defined only by the appended claims.

Applicant hereby incorporates the disclosure of Applicant's U.S. Pat. No. 8,910,595 B2 by reference thereto to complete this disclosure if required. Although the instant invention functions very well with the livestock squeeze chute of the '595 patent, the instant invention will function with other livestock squeeze chutes.

The numeral 10 refers to the livestock squeeze chute of this invention which has a tail end 12, a head end 14, a first side 16 and a second side 18. Squeeze chute 10 includes a lower frame means 20 which extends between the tail end 12 and the head end 14 of the squeeze chute 10. Squeeze chute 10 also includes an upper frame means 22 which extends between the tail end 12 and the head end 14 of the squeeze chute 10. The lower frame means 20 and the upper frame means 22 are interconnected by various frame members generally collectively referred to by the reference numeral 24. The squeeze chute 10 includes spaced-apart side squeeze panels 26 and 28 which are laterally movable in conventional fashion to aid in restraining the animal being handled. The upper ends of the panels 26 and 28 are moved inwardly and outwardly by a hydraulic cylinder 29 connected thereto in conventional fashion. In some cases, the lower ends of the panels 26 and 28 are also moved inwardly and outwardly by a hydraulic cylinder.

The numeral 30 refers generally to a conventional tail gate assembly consisting of two movable tail gates 32 and 34 which are selectively movable between open and closed positions in a transverse manner with respect to the longitudinal axis of the squeeze chute 10. The tail gates 32 and 34 are pivotally movable by hydraulic cylinders 32A and 34A attached thereto respectively in conventional fashion.

The numeral 36 refers to a horizontally disposed lower head gate support including a first support member 38 and a second support member 40 which are joined together at their inner forward ends to define a V-shape. As seen, support member 38 extends inwardly and forwardly from side 16 at approximately 30 degrees to the longitudinal axis of the chute 10 at the head end 14 of squeeze chute 10. Support member 38 has a rearward end 42 which is positioned outwardly of the squeeze chute 10. As seen, support member 40 extends forwardly and inwardly from side 18 of squeeze chute 10 at approximately a 30-degree angle with respect to the longitudinal axis of the chute 10. Support member 40 has a rearward end 44 which is positioned outwardly of the squeeze chute 10.

The numeral 46 refers to a first head gate member while the numeral 48 refers to a second head gate member. Head gate member 46 includes an upper end 50, a lower end 52, an outer side 54 and an inner side 56. Inner side 56 of head gate member 46 has an outwardly extending angular or arcuate portion 58 to provide a space for the animal's neck. The lower end 52 of head gate member 40 is pivotally secured to support member 38 at 60. The upper inner end of head gate member 46 has an upwardly extending protrusion or contact point 62, the purpose of which will be described hereinafter. The lower end of a hydraulic cylinder 64 is pivotally connected to the rearward end 42 of support member 38 at 66. The rod end of hydraulic cylinder 64 is pivotally secured to head gate member 46 at 68.

Head gate member 48 includes an upper end 70, a lower end 72, an outer side 74 and an inner side 76. Inner side 76 of head gate member 48 has an outwardly extending angular or arcuate portion 78 to provide a space for the animal's neck. The lower end 72 of head gate member 48 is pivotally secured to support member 40 at 80. The upper inner end of head gate member 48 has an upwardly extending protrusion or contact point 82, the purpose of which will be described hereinafter. The lower end of a hydraulic cylinder 84 is pivotally connected to the rearward end 44 of support member 40 at 86. The rod end of hydraulic cylinder 84 is pivotally secured to head gate member 48 at 88.

The numeral 90 refers to a horizontally disposed upper head gate support including a first support member 92 and a second support member 94 which are joined together to define a V-shape which is the same as the V-shaped support 36. As seen, support member 92 extends inwardly and forwardly from side 16 at the head end 14 of squeeze chute 10. Support member 92 has a rearward end 96 which is positioned outwardly of the squeeze chute 10. As also seen, support member 94 extends forwardly and inwardly from side 18 of the squeeze chute 10. Support member 94 has a rearward end 98 which is positioned outwardly of the squeeze chute 10.

Support member 92 has an elongated slot 100 formed therein and support member 94 has an elongated slot 102 formed therein. The forward ends of the slots 100 and 102 communicate with each other. Protrusion 62 of head gate member 46 extends upwardly through slot 100 in support member 92 with protrusion 82 of head gate member 48 extending upwardly through slot 102 in support member 94. The head gate members 46 and 48 and their supporting structure will be described as a head gate assembly 103.

The numeral 104 refers to an elongated and horizontally disposed support member having a forward end 106 and a rearward end 108. The support member 104 is mounted on the upper end of the squeeze chute 10 near the middle of the chute 10. The support member or rail 104 is selectively longitudinally adjustably secured to the upper end of the squeeze chute 10. The numerals 110, 112, 114 and 116 refer to laser sensors which are mounted on the support member 104. Preferably, the sensors 110, 112, 114 and 116 are laser sensors of conventional off-the-shelf design. The laser sensors 110, 112, 114 and 116 are pointed downwardly. The sensors 110, 112, 114 and 116 are selectively longitudinally adjustably secured to the support member 104. A sensor 118 is built into the hydraulic cylinder 84. A sensor 120 is built into the hydraulic cylinder 29. A sensor 122 is built into the hydraulic cylinder 34A.

The numeral 124 refers to a control module which is preferably mounted on chute 10. Leads 126, 128, 130 and 132 extend from sensors 110, 112, 114 and 116 respectively to the input side of control module 124. A lead 134 extends from the sensor 118 of hydraulic cylinder 84 to the input side of control module 124. Lead 135 extends from the sensor 120 of hydraulic cylinder 29 to the input side of control module 124. A lead 136 extends from the sensor 122 of hydraulic cylinder 34A to the input side of control module 124.

The numeral 138 refers to a valve module or valve body having a hydraulic fluid supply and return valve portion 140, a hydraulic bottom valve or spool portion 142, a head gate valve or spool portion 144, a side squeeze panel valve or spool portion 146, and a tail gate valve or spool portion 148. Valve portions 144, 146 and 148 have close solenoids 150, 152 and 154 associated therewith respectively. Valve portions 144, 146 and 148 have open solenoids 156, 158 and 160 associated therewith respectively. Valve portions 144, 146 and 148 have manual levers 162, 164 and 166 associated therewith respectively. Valve module 138 also has a pressure sensor 168 connected thereto.

Leads 170, 172 and 174 extend from the solenoids 150, 152 and 154 respectively to the control module 124. Leads 176, 178 and 180 extend from solenoids 156, 158 and 160 respectively to the control module 124. A lead 182 extends from pressure sensor 168 to the control module 124.

Figure 1:
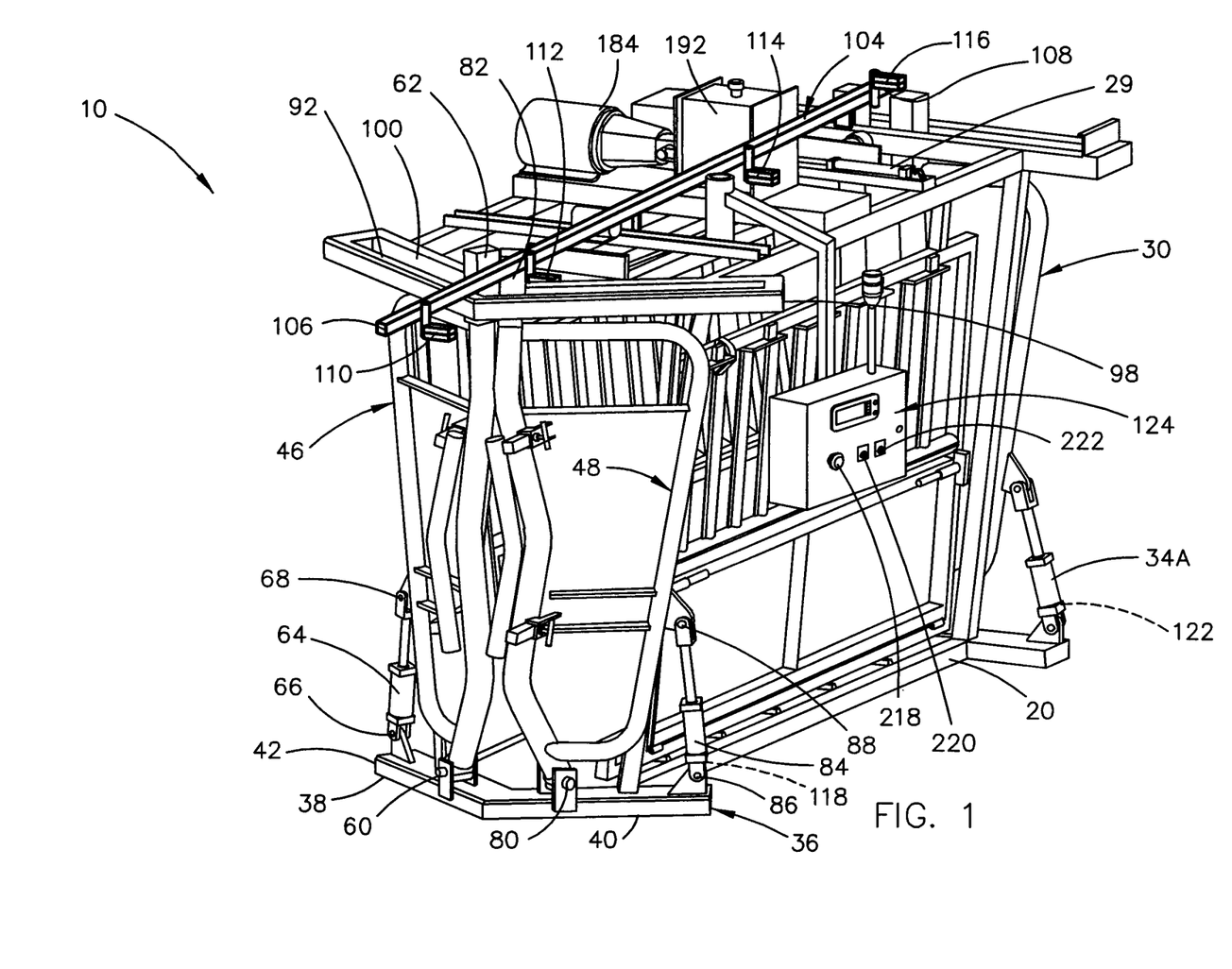
FIG. 1 is a front perspective view of the squeeze chute of this invention.
Figure 2:
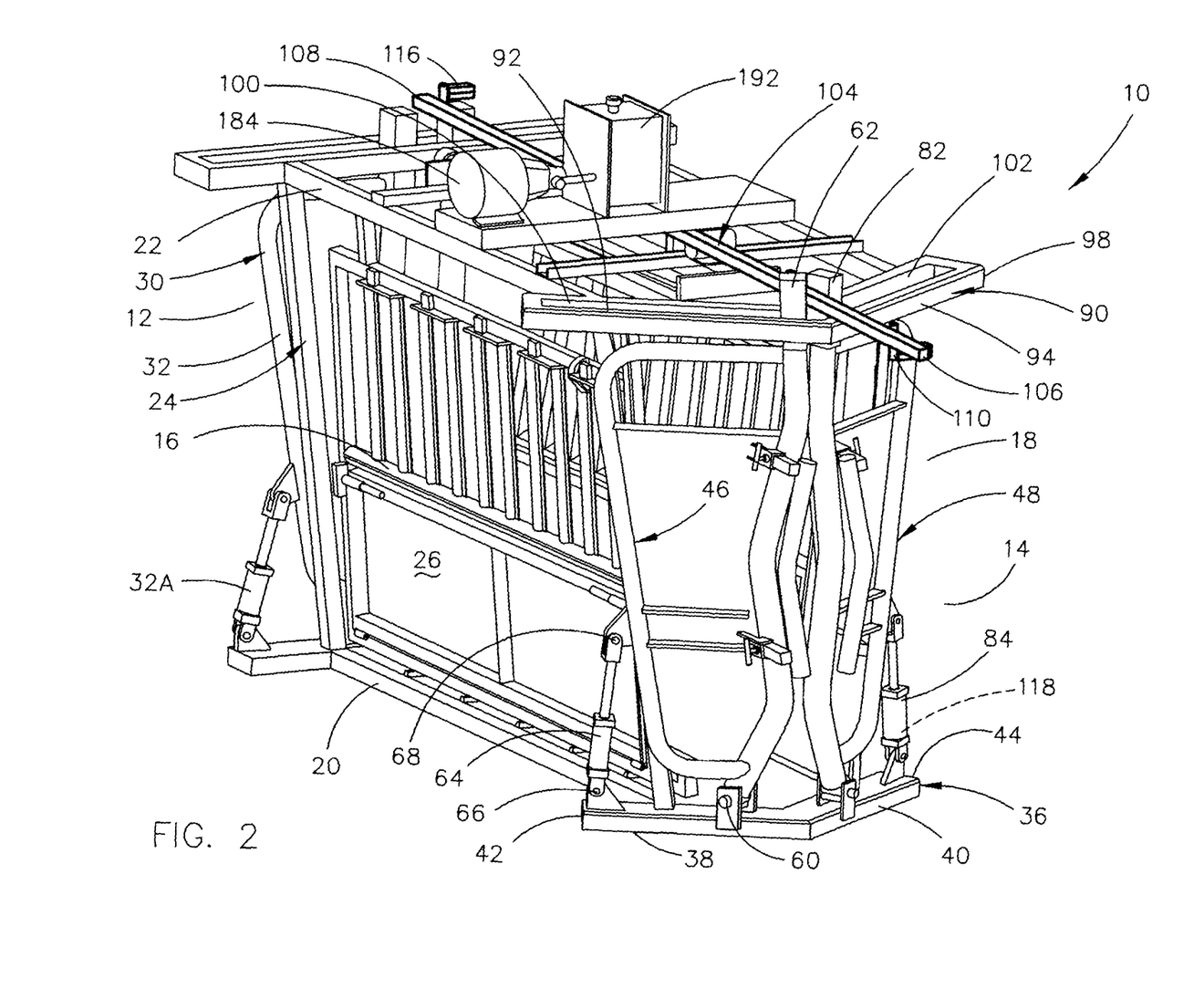
FIG. 2 is another front perspective view of the squeeze chute of this invention.
Figure 3:
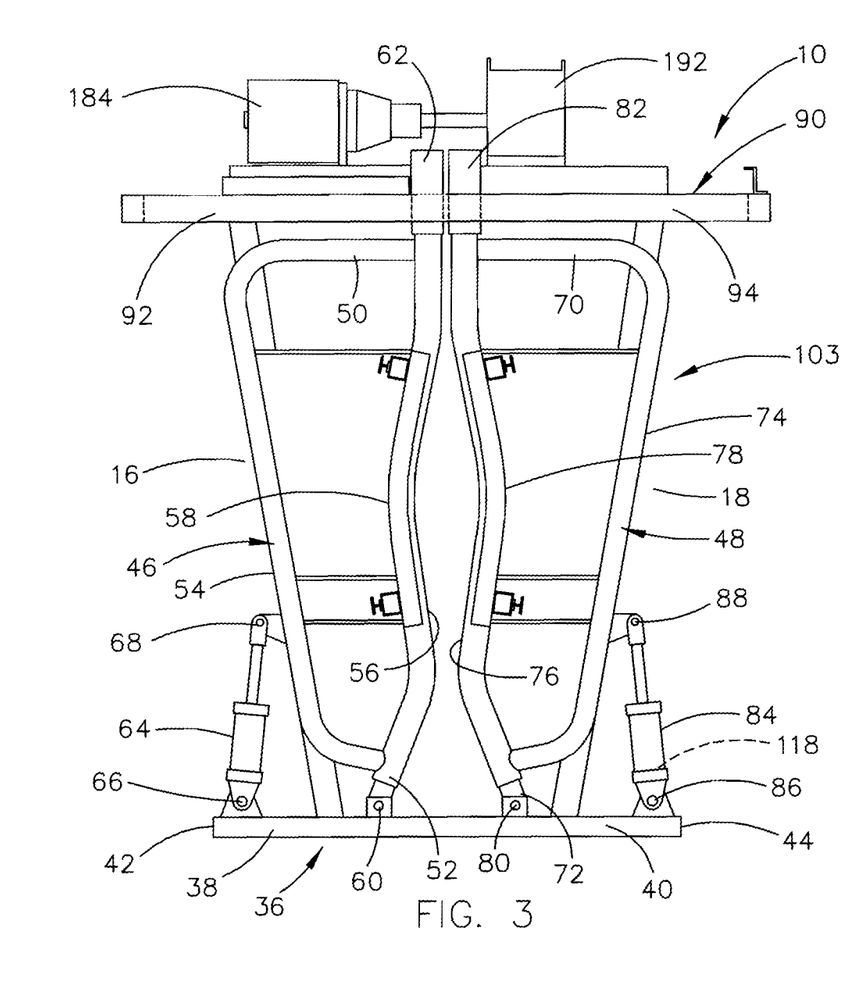
FIG. 3 is a front view of the squeeze chute of this invention.
Figure 4:
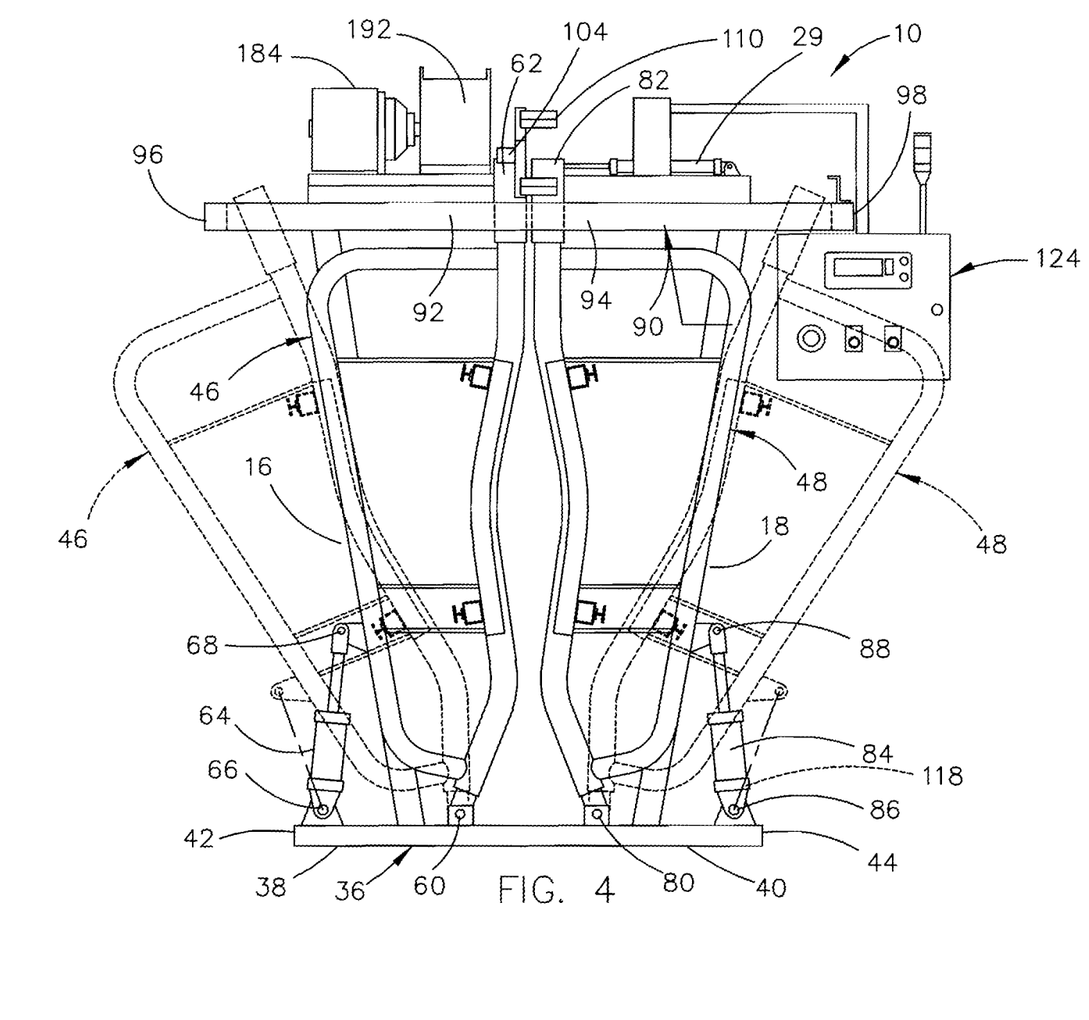
FIG. 4 is another front view of the squeeze chute of this invention with the broken lines illustrating the head gate members in the open position.
Figure 5:
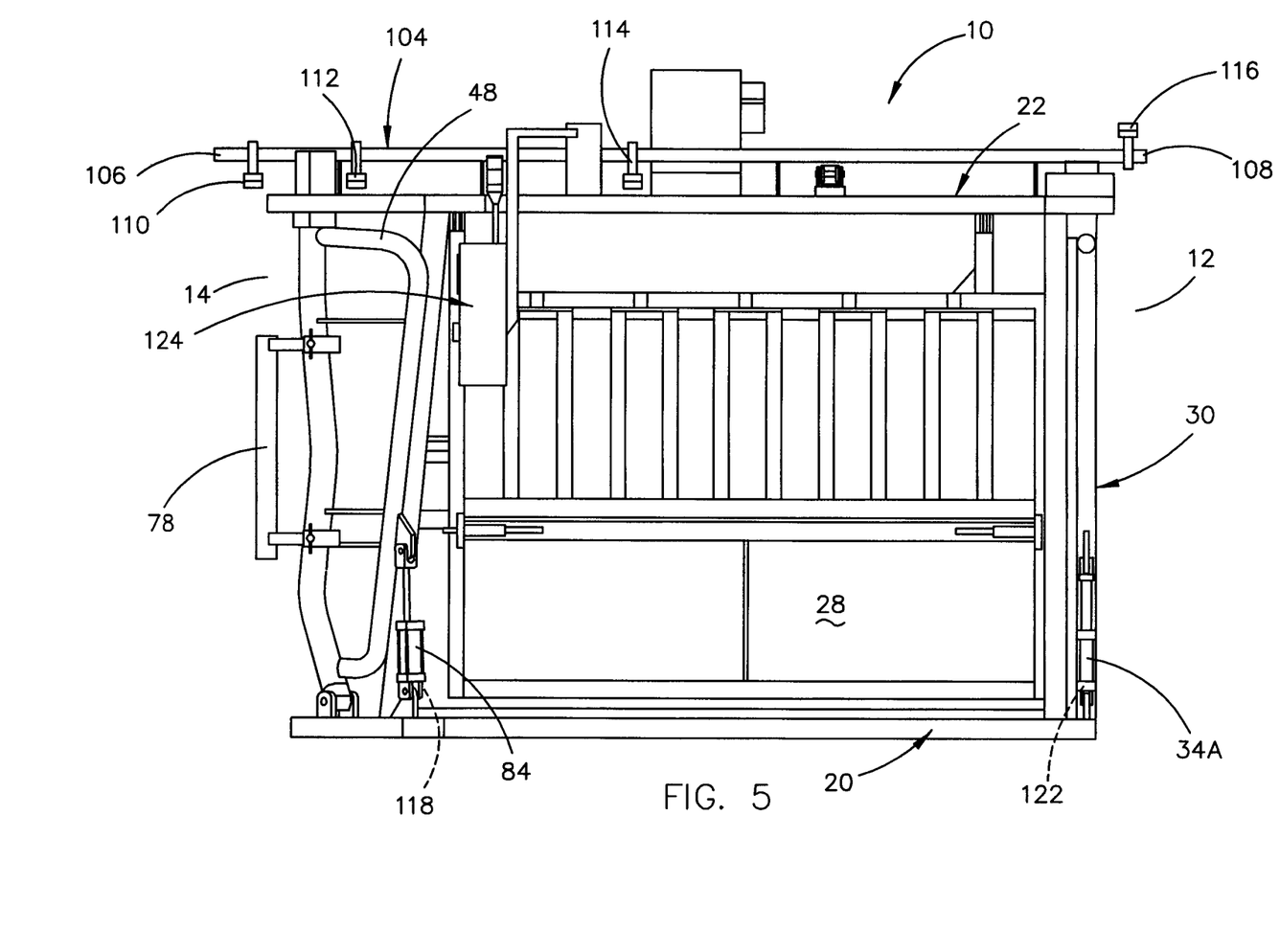
FIG. 5 is a side view of the squeeze chute of this invention.
Figure 6:
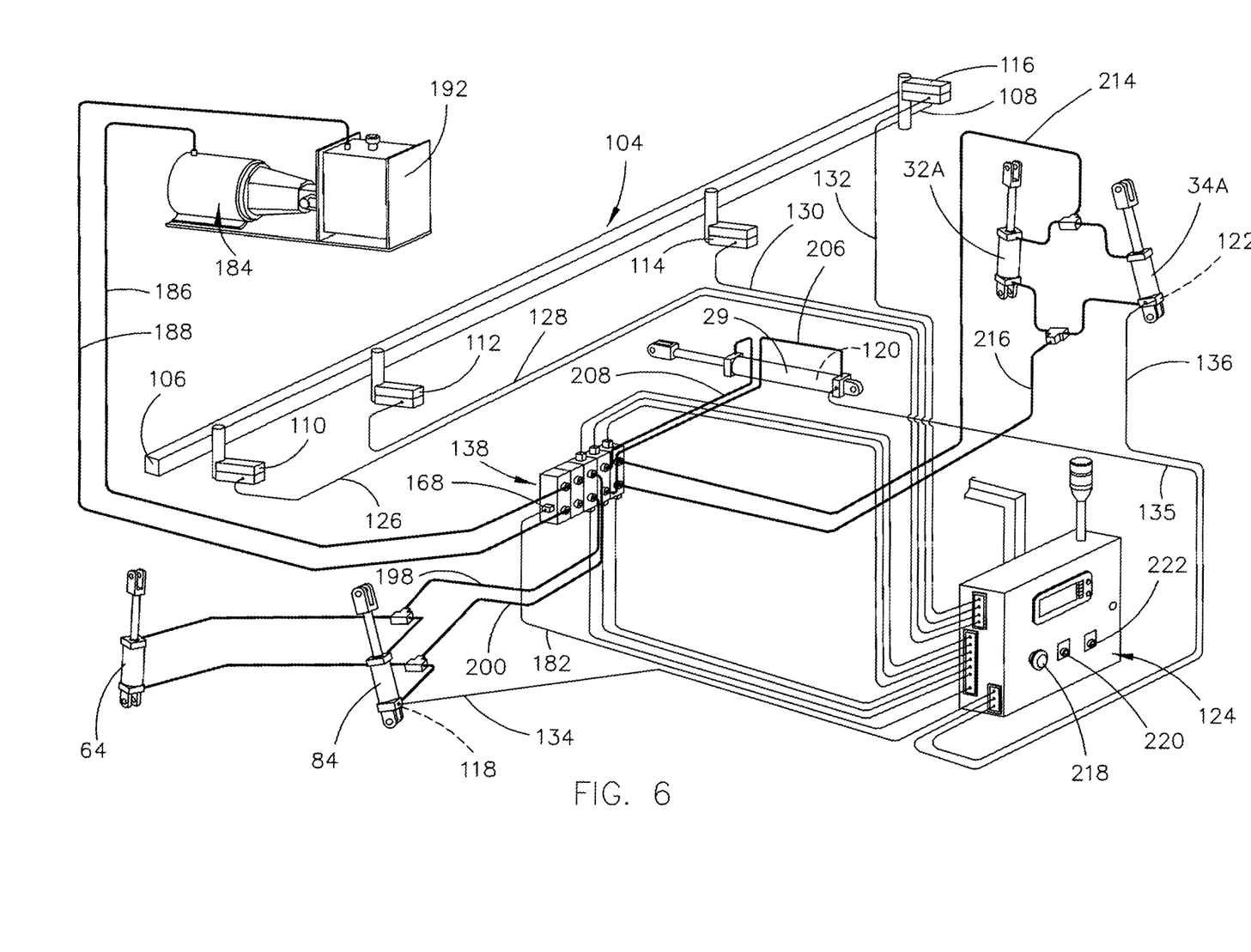
FIG. 6 is a schematic view of the squeeze chute of this invention.
Figure 7:
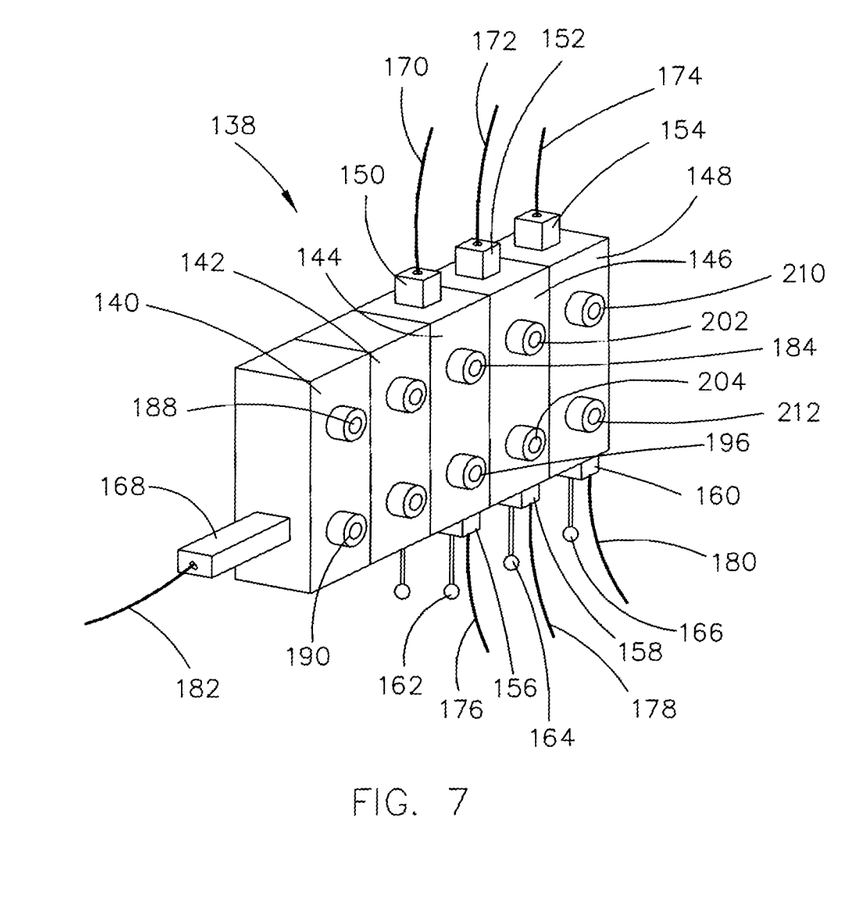
FIG. 7 is a perspective view of the valve module of this invention.

The numeral 184 refers to an electric pump which has a hydraulic fluid discharge line or hose 186 extending therefrom to the fluid supply port 188 of valve portion 140. A return line or hose 188 extends from the fluid return port 190 of valve portion 140 to the fluid return tank 192. Hydraulic cylinders 64 and 84 are fluidly connected to the ports 194 and 196 of valve module 138 by hoses 198 and 200 as seen in FIGS. 4 and 7. Hydraulic cylinder 29 is fluidly connected to the ports 202 and 204 of valve module 138 by hoses 206 and 208 respectively. Hydraulic cylinders 32A and 32B are fluidly connected to ports 210 and 212 of valve module 138 by hoses 214 and 216.

The operation of the invention will now be described. The control module 124 contains the program to operate the chute. The program takes the information from the sensors 110, 112, 114 and 116 that are mounted on the support member or rail 104 with those sensors being located at the top of the chute. The above-identified sensors point down and sense if an animal is in the corresponding positions or if there is no animal in that position. The control module 124 also receives information from the sensors 118, 120 and 122 positioned in the cylinders 84, 29 and 34A respectively. The sensors 118, 120 and 122 in the hydraulic cylinders 84, 29 and 34A respectively are position sensors which give feedback to the control module 124 to identify where the cylinder is at in terms of position of the stroke of the ram of the cylinder. This equates to the position of the head gate members, the side squeeze panels and the tail gate members. This permits the operator to have repeatability in the presets due to the fact the presets are set in the "home position" that the operator wants the three functions to be reached so that the animal is catched and lets the operator know the maximum open position for when the animal is to be released from the chute.

The pressure control sensor 168 reads the pressure of the system. The system is set to a maximum pressure that the system may run at a safe operating pressure to not hurt the animal due to over squeezing. The pressure sensor 168 is also used to close the side squeeze panels to a set pressure. The control module 124 also receives information from the pressure sensor 168. The control module 124 then causes movement of the hydraulic chute by sending signals to the solenoids of the valve module 138.

When operating the hydraulic chute with the automatic catch system, the operator turns on the hydraulic power unit 184 and the control module 124 by way of switch 218. The operator then arms the automatic catch system by pressing the run button on the control module 124. The control module 124 will then move the head gate members 46 and 48 to the preset "home" or open position. The side squeeze panels are moved to the preset "home" or open position and the rear tail gate doors are moved to the open position. This allows the animal to come into the chute. As the animal clears sensor 116, the control module closes the tail gates 32 and 34. This keeps a second animal form entering the chute. As the animal moves through the chute, sensor 114 initially senses the animal and then the animal is sensed by sensor 112. As sensor 112 senses the animal, the control module 124 closes the side squeeze panels to pressure, catching the animal's body. Sensor 110 senses the animal and determines the position of the animal's head. If the animal's head is in the preset catch zone, the control module 124 closes the head gate members 46 and 48 to pressure. The animal is now caught. After the operator is done working the animal and wants to release the animal, the operator pushes the release 222 button on the control module 124. This starts the sequence of opening the head gate members 46 and 48 to the maximum open position followed by the squeeze panels being moved to the maximum open position. After the animal has cleared sensors 110, 112 and 114, the control module 124 determines that the animal has left the chute and sends signals to the valve body's solenoids which in turn moves the cylinders of the head gate members and side squeeze panels to the home positions for the next animal. After the "home" position is reached, the rear tail gates 32 and 34 are opened to their maximum open position to allow the next animal to come into the chute. The process is then restarted. The control module 124, sensors 110, 112, 114, 116, 118, 120 and 122 and the valve solenoids work in unison. The control module 124 contains different protocols that the control module 124 performs depending on whether the animal is backing up, a second animal comes into the chute with the first animal still in the chute, or the animal is stalling in the chute, etc. These protocols help maintain better accuracy across the different scenarios that arise dealing with an unpredictable animal.

The preset "home" positions are set to fit different weight classes of cattle. The preset "home" positions can be adjusted by the operator to better conform to the weight of the animals being run. Further, the support member 104 is longitudinally selectively movable with respect to the chute. Further, the sensors 110, 112, 114 and 116 are longitudinally selectively moveably mounted on the support member or rail 104.

Thus it can be seen that the invention accomplishes at least all of its stated objectives.

Although the invention has been described in language that is specific to certain structures and methodological steps, it is to be understood that the invention defined in the appended claims is not necessarily limited to the specific structures and/or steps described. Rather, the specific aspects and steps are described as forms of implementing the claimed invention. Since many embodiments of the invention can be practiced without departing from the spirit and scope of the invention, the invention resides in the claims hereinafter appended.

I claim:

1. A livestock catch and release system, comprising:
   a livestock squeeze chute having a tail end, a head end, a first side, a second side, an upper end and a lower end;
   said livestock squeeze chute including a hydraulically operated head gate assembly having first and second head gate members at said head end thereof which are movable between open and closed positions;
   said head gate assembly including a catch portion for capturing the neck and head of an animal being processed;
   said livestock squeeze chute including a hydraulically operated tail gate assembly, having first and second tail gate members at said tail end thereof which are movable between open and closed positions;
   said livestock squeeze chute including hydraulically operated side squeeze panels which are movable towards the animal or away from the animal;
   a first hydraulic cylinder operatively connected to said first head gate member for moving said first head gate member between open and closed positions;
   a second hydraulic cylinder operatively connected to said second head gate member for moving said second head gate member between open and closed positions;
   a third hydraulic cylinder operatively connected to said side squeeze panels for moving said side squeeze panels from an open position to a closed position and for moving said side squeeze panels from a closed position to an open position;
   said side squeeze panels normally being in said open position;
   a fourth hydraulic cylinder operatively connected to said first tail gate member for moving said first tail gate member between open and closed positions;
   a fifth hydraulic cylinder operatively connected to said second tail gate member for moving said second tail gate member between open and closed positions;
   an elongated and horizontally disposed sensor support having a forward end and a rearward end;
   said sensor support being mounted on said upper end of said livestock squeeze chute;
   said sensor support having first, second, third and fourth sensors mounted therein in a longitudinally spaced-apart manner;
   said first sensor being mounted on said sensor support at said forward end thereof;
   said second sensor being mounted on said sensor support rearwardly of said first sensor;
   said third sensor being mounted on said sensor support rearwardly of said second sensor;
   said fourth sensor being mounted on said sensor support rearwardly of said third sensor;
   said fourth sensor sensing when an animal has entered said livestock squeeze chute so that said control module will operate said valve body to close said tail gate assembly rearwardly of the animal;
   said third sensor sensing movement of the animal through said livestock squeeze chute;
   upon said second sensor sensing the animal in said livestock squeeze chute, said control module moves said side squeeze panels from said open position to said closed position towards the animal thereby catching the animal's body;
   said first sensor determines the position of the animal's head whereby said control module closes head gate members thereby catching the animal;
   said first hydraulic cylinder having a fifth sensor incorporated therein;
   said third hydraulic cylinder having a sixth sensor incorporated therein;
   said fourth hydraulic cylinder having a seventh sensor incorporated therein;
   a control module including a software program mounted on said squeeze chute;
   said first, second, third, fourth, fifth, sixth and seventh sensors being electronically connected to said control module;
   a valve body in fluid communication with said first, second, third, fourth and fifth hydraulic cylinders which operates said first, second, third, fourth and fifth hydraulic cylinders;
   said fifth, sixth and seventh sensors providing feedback to said control module to ascertain the position of said first, second and third hydraulic cylinders respectively in terms of the position of the stroke of the ram of the respective hydraulic cylinder; and
   said control module being operatively connected to valve body and said sensors to operate said valve body in response to signals sent from said first, second, third, fourth, fifth, sixth and seventh sensors.

2. The system of claim 1 wherein sensor support is selectively longitudinally adjustably secured to upper end of said chute.

3. The system of claim 1 wherein said first, second, third and fourth sensors are selectively longitudinally adjustably secured to said sensor support.

4. The system of claim 1 wherein an eighth sensor is operatively secured to said valve body to sense the pressure therein and wherein said eighth sensor is connected to said control module.

* * * * *